United States Patent
Onishi et al.

(10) Patent No.: US 12,508,554 B2
(45) Date of Patent: Dec. 30, 2025

(54) DISPERSION DEVICE AND POWDER FEED MEMBER

(71) Applicant: NIHON SPINDLE MANUFACTURING CO., LTD., Hyogo (JP)

(72) Inventors: Keiichiro Onishi, Hyogo (JP); Keiichi Asami, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 790 days.

(21) Appl. No.: 17/856,698

(22) Filed: Jul. 1, 2022

(65) Prior Publication Data
US 2022/0331754 A1 Oct. 20, 2022

Related U.S. Application Data

(63) Continuation of application No. PCT/JP2020/042813, filed on Nov. 17, 2020.

(30) Foreign Application Priority Data

Feb. 10, 2020 (JP) .................................. 2020-020915

(51) Int. Cl.
*B01F 23/50* (2022.01)
*B01F 23/53* (2022.01)
(Continued)

(52) U.S. Cl.
CPC .............. *B01F 23/59* (2022.01); *B01F 23/53* (2022.01); *B01F 23/551* (2022.01); *B01F 23/56* (2022.01);
(Continued)

(58) Field of Classification Search
CPC .. B01F 23/59; B01F 35/71745; B01F 35/711; B01F 35/71731; B01F 25/52
See application file for complete search history.

(56) References Cited

U.S. PATENT DOCUMENTS 4,725,379 A * 2/1988 Baumgartner .... B01F 35/71745
507/224
6,029,853 A * 2/2000 Kubo ...................... B01F 23/53
222/204

(Continued)

FOREIGN PATENT DOCUMENTS

JP S63-006040 U 1/1988
JP H03-094937 U 9/1991
(Continued)

OTHER PUBLICATIONS

Machine Translation of JP 2010042376, accessed via worldwide.espacenet.com (Year: 2010).*

(Continued)

*Primary Examiner* — Marc C Howell
(74) *Attorney, Agent, or Firm* — Michael Best & Friedrich LLP

(57) ABSTRACT

A dispersion device includes a stirring and mixing unit that mixes a powder with a liquid, a powder feed unit that feeds the powder to the stirring and mixing unit, and a dry gas generation unit that supplies a dry gas to the powder feed unit. The powder feed unit is sealable.

14 Claims, 5 Drawing Sheets

(51) Int. Cl.
  *B01F 35/21*   (2022.01)
  *B01F 35/221*  (2022.01)
  *B01F 35/71*   (2022.01)
  *B01F 101/06*  (2022.01)
  *B01F 101/21*  (2022.01)

(52) U.S. Cl.
  CPC ...... *B01F 35/2113* (2022.01); *B01F 35/2211* (2022.01); *B01F 35/711* (2022.01); *B01F 35/71745* (2022.01); *B01F 35/71805* (2022.01); *B01F 2101/06* (2022.01); *B01F 2101/21* (2022.01)

(56) References Cited

U.S. PATENT DOCUMENTS

| | | |
|---|---|---|
| 11,547,974 B2 | 1/2023 | Onishi et al. |
| 2010/0027371 A1 | 2/2010 | Lucas et al. |
| 2010/0102463 A1* | 4/2010 | Arnet ................ B01F 35/71761 264/1.32 |
| 2010/0220549 A1* | 9/2010 | Holdsworth ........... B65G 53/48 366/167.1 |
| 2015/0003185 A1* | 1/2015 | Woodle ................ B01F 33/811 366/136 |
| 2018/0071699 A1 | 3/2018 | Hiramatsu et al. |
| 2019/0264517 A1* | 8/2019 | Chong .................... B01F 25/52 |
| 2020/0222863 A1* | 7/2020 | Onishi .............. B01F 35/71731 |

FOREIGN PATENT DOCUMENTS

| | | |
|---|---|---|
| JP | H08-229378 A | 9/1996 |
| JP | 2010-042376 A | 2/2010 |
| JP | 2019-169299 A | 10/2019 |
| JP | 2020-182891 A | 11/2020 |
| WO | 2019/087559 A1 | 5/2019 |

OTHER PUBLICATIONS

Search Report issued in European Application No. 20919095.8, mailed Feb. 20, 2023.
International Search Report issued in Application No. PCT/JP2020/042813, mailed Jan. 26, 2021.

* cited by examiner

DISPERSION DEVICE AND POWDER FEED MEMBER

RELATED APPLICATIONS

The contents of Japanese Patent Application No. 2020-020915, and of International Patent Application No. PCT/JP2020/042813, on the basis of each of which priority benefits are claimed in an accompanying application data sheet, are in their entirety incorporated herein by reference.

BACKGROUND

Technical Field

Certain embodiments of the present invention relate to a dispersion device and a powder feed member. More specifically, the present invention relates to a dispersion device and a powder feed member capable of appropriately handling a powder affected by atmospheric moisture in mixing the powder and a liquid.

Description of Related Art

Mixing a powder with a liquid, such as dissolving and dispersing the powder into the liquid, has been practiced in a wide range of fields. Examples of these application fields include food manufacturing, cosmetics manufacturing, and material preparation for industrial products.

In the mixing of the powder and the liquid, in particular, in a case where a slurry, which is a mixture of the powder and the liquid, is prepared, it is required to suppress changes in the physical properties and state of the powder such as aggregation of the powder during and after mixing, and to maintain and improve the quality of the slurry.

As a method of manufacturing an electrode material (active material) for a solid battery, for example, the related art describes using a mixing device that mixes an active material, a solid electrolyte, a conductive material, and a dispersion medium with each other to perform a first dispersion process of dispersing the solid electrolyte in the dispersion medium and then perform a second dispersion process of feeding and dispersing the active material and the conductive material.

SUMMARY

According to an aspect of the present invention, there is provided a dispersion device including a stirring and mixing unit that mixes a powder with a liquid, a powder feed unit that feeds the powder to the stirring and mixing unit, and a dry gas generation unit that supplies a dry gas to the powder feed unit, in which the powder feed unit is sealable.

According to another aspect of the present invention, there is provided a powder feed member that feeds a powder to a stirring and mixing unit that mixes the powder with a liquid. The powder feed member includes a powder holding portion that holds the powder; a dry gas introducing portion that introduces a dry gas; and a powder discharging portion that discharges the powder, in which the powder holding portion is sealable.

DETAILED DESCRIPTION

Figure 1:
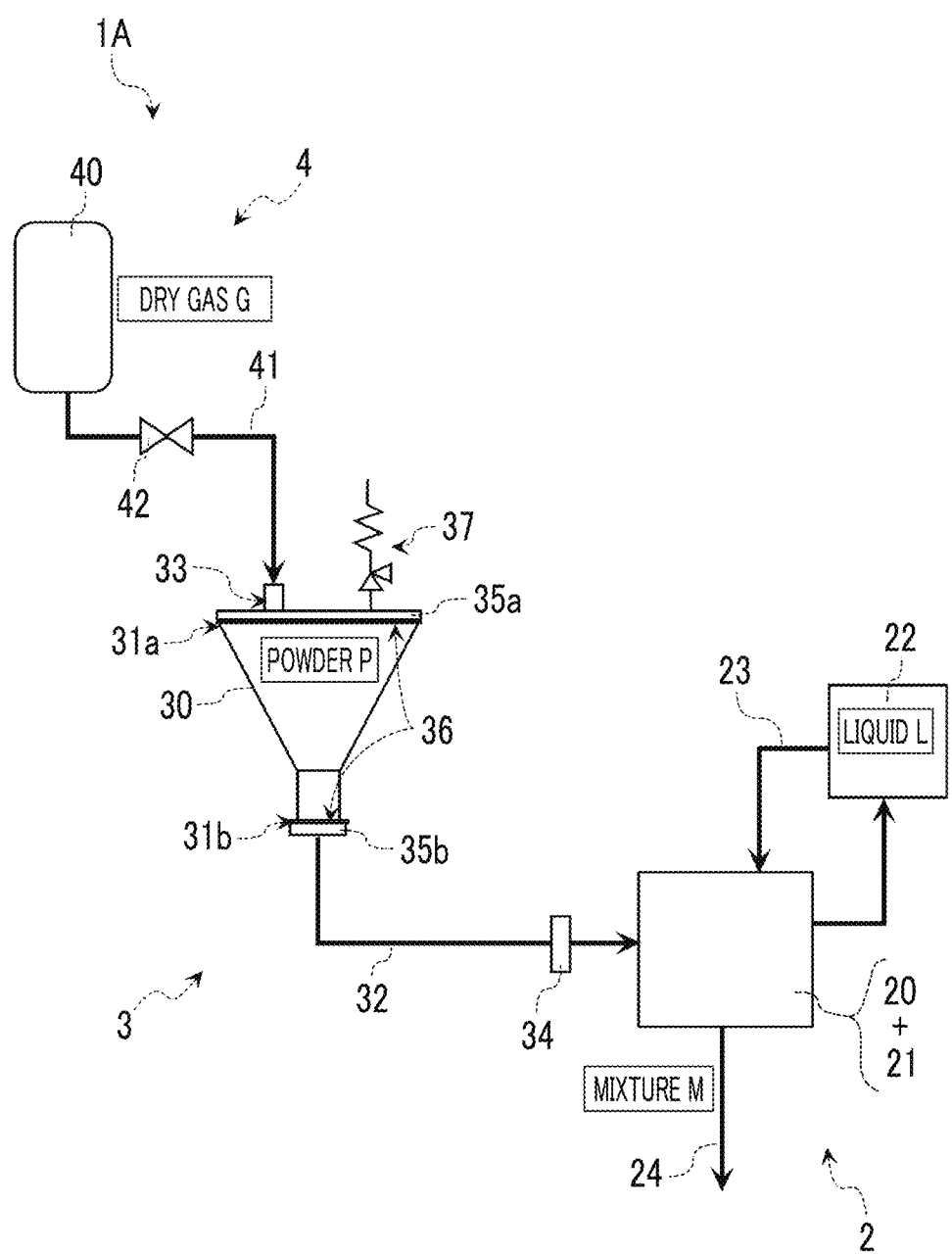
FIG. 1 is a schematic explanatory view showing a structure of a dispersion device according to one embodiment of the present invention.

The related art describes that the dispersion process is divided into two stages in order to disperse the solid electrolyte that easily aggregates and the active material and the conductive material in the dispersion medium. Accordingly, it is described that the aggregation of the solid electrolyte in the dispersion medium is suppressed and the deterioration of the quality of the slurry (active material) is suppressed.

Meanwhile, in the mixing of the powder and the liquid, it is necessary to handle the powder affected by the atmospheric moisture depending on the properties required for the mixture (solution or slurry) of the powder and the liquid. In particular, in a case where the mixture of the powder and the liquid is an electrode material (electrode slurry) of a secondary battery that is a mixture of a functional material (powder) such as the active material and the dispersion medium (liquid), the functional material and the moisture react with each other. As a result of the reaction, there are concerns that degeneration and decomposition of the functional material occur, and not only the performance of the electrode slurry after mixing deteriorates but also harmful gas is generated.

For this reason, in order to maintain and improve the performance of the mixture after mixing, and to ensure safety during mixing work, it is necessary to suppress the reaction between the powder and the atmospheric moisture.

In order to suppress the reaction between the powder and the atmospheric moisture, it is conceivable to work in a low-humidity environment such as a dry room (or glove box). However, when the entire mixing device as described in the related art is disposed in the low-humidity environment, the size and number of dry rooms increase in order to secure a work space, and the initial cost and running cost increase. Additionally, when the size of the dry room increases, it is difficult to maintain the entire environment in the dry room under the same conditions.

For this reason, it is required to suppress the reaction between the powder and the atmospheric moisture more reliably by using simpler means than in a case where the entire device is disposed in the low-humidity environment such as the dry room.

It is desirable to provide a dispersion device and a powder feed member capable of easily blocking contact with a powder and atmospheric moisture during the storage and transfer of the powder in order to suppress a reaction between the powder before mixing and the atmospheric moisture during the mixing of the powder and the liquid.

As a result of keen studies on the above circumstances, the present inventors provide a powder feed unit that feeds a powder to a stirring and mixing unit that mixes the powder with a liquid, supplies a dry gas to the powder feed unit, and makes the powder feed unit sealable, thereby finding that the contact between the powder and the atmospheric moisture can be easily blocked, to complete the present invention.

That is, the present invention is the following dispersion device and powder feed member.

According to the dispersion device of the present invention, the powder feed unit is allowed to be sealed and the dry gas is allowed to be supplied to easily block the contact between the powder before being mixed with the liquid and the atmospheric moisture. Accordingly, it is possible to suppress the influence of the powder by the atmospheric moisture without providing a dry room that covers the entire device during the storage and transfer of the powder, to maintain and improve the performance of the mixture after mixing, and to ensure safety during mixing work at low cost.

Additionally, as one embodiment of the dispersion device of the present invention, an inside of the stirring and mixing unit may be in a negative pressure state.

According to this feature, since the inside of the stirring and mixing unit is in a negative pressure state, when the powder is fed from the powder feed unit to the stirring and mixing unit, the powder quickly moves to the stirring and mixing unit side. Accordingly, it is possible to block the contact between the powder before being mixed with the liquid and the atmospheric moisture more reliably during the transfer of the powder.

Additionally, as one embodiment of the dispersion device of the present invention, an inside of the powder feed unit may be in a positive pressure state.

According to this feature, it is possible to suppress the inflow of outside air into the inside of the powder feed unit. Accordingly, it is possible to block the contact between the powder before being mixed with the liquid and the atmospheric moisture more reliably during the storage of the powder.

Additionally, one embodiment of the dispersion device of the present invention may further include a pressure gauge that measures an internal pressure of the powder feed unit, and a control unit that adjusts a supply amount of the dry gas supplied from the dry gas generation unit on the basis of a pressure value measured by the pressure gauge.

According to this feature, it is easy to bring the inside of the powder feed unit into an environment suitable for blocking the contact between the powder and the atmospheric moisture, and it is also easy to maintain the environment.

According to the powder feed member, the powder feed unit is allowed to be sealed and the dry gas is allowed to be supplied to easily block the contact between the powder before being mixed with the liquid and the atmospheric moisture. Accordingly, it is possible to suppress the influence of the atmospheric moisture on the powder without providing a dry room that covers the entire device during the storage or transfer of the powder. Moreover, by applying the powder feed member to an existing dispersion device that mixes the powder with the liquid, it is possible to maintain and improve the performance of the mixture after mixing, and to ensure safety during mixing work at low cost.

Hereinafter, a dispersion device and a powder feed member according to the present invention will be described in detail with reference to the drawings.

In addition, dispersion devices and powder feed members described in embodiments are merely exemplified for explaining the dispersion device and the powder feed member according to the present invention, and the present invention is not limited thereto.

The dispersion device in the present invention may be any device that mixes a powder with a liquid, and the treatment content related to the mixing is either dissolution of the powder in the liquid or dispersion of the powder in the liquid. Accordingly, a mixture obtained by the dispersion device in the present invention is in the form of a liquid or a slurry.

Additionally, the dispersion device of the present invention can be widely applied in a field in which the mixing of the powder and the liquid is utilized. Examples of such a field include food manufacturing, cosmetics manufacturing, and material preparation for industrial products. In particular, the dispersion device can be suitably used for the material preparation of industrial products that often handle powders (functional materials) that are easily affected by moisture.

Examples of the powder in the present invention include those that are affected by atmospheric moisture and undergo status changes or chemical changes. Examples of the powder include powders having high hygroscopicity and deliquescency, and powders that easily aggregate or decompose due to moisture.

In particular, examples of the powder in the present invention include the use of active materials (positive electrode active material and negative electrode active material) known as electrode materials for secondary batteries, solid electrolytes, binders, and the like. The powder used as the electrode material may react with atmospheric moisture. In this case, it is known that a chemical reaction such as the decomposition of components of the powder may occur, and the mixture obtained by mixing the powder with the liquid may impair the functions and properties originally assumed, or may generate harmful gas. Accordingly, when a substance used as an electrode material is used as the powder and the powder is mixed with the liquid, the dispersion device and the powder feed member of the present invention can be applied to obtain the effect caused by easily blocking the contact between the powder and the atmospheric moisture to the maximum.

The liquid in the present invention is not particularly limited as long as the liquid is mixed with the above-described powder to form a mixture. For example, examples of the liquid include non-aqueous solvents (inorganic/organic) in addition to water. The type of liquid can be appropriately selected in consideration of the combination with the powder according to the function and properties required as the mixture.

One Embodiment

FIG. 1 is a schematic explanatory view showing the structure of a dispersion device according to one embodiment of the present invention.

As shown in FIG. 1, a dispersion device 1A includes a stirring and mixing unit 2, a powder feed unit 3, and a dry gas generation unit 4. In addition, the dispersion device 1A shown in FIG. 1 shows an example of the dispersion device 1A in the present embodiment and is not limited to the configuration shown in FIG. 1.

As shown in FIG. 1, the dispersion device 1A of the present embodiment feeds a powder P from the powder feed unit 3 storing the powder P to the stirring and mixing unit 2 that performs the mixing of the powder P with a liquid L to obtain a mixture M. In this case, the dry gas generation unit 4 is connected to the powder feed unit 3, and a dry gas is supplied into the powder feed unit 3. In addition, the mixture M obtained by the dispersion device 1A may be directly transferred to an implementation spot or use point for the next process, or may be stored in a storage tank or the like.

Stirring and Mixing Unit

The stirring and mixing unit 2 is for preparing the mixture M by performing the mixing treatment between the powder P with the liquid L. In addition, the stirring and mixing unit 2 in the present embodiment refers to a spot where the treatment f mixing the powder P with the liquid L to obtain the mixture M is performed, and the treatment content includes the dissolution or dispersion of the powder P with respect to the liquid L.

The stirring and mixing unit 2 may be, for example, any one capable of stirring and mixing in a space including a stirring mechanism, and the specific structure thereof is not particularly limited. As shown in FIG. 1, examples of the structure of the stirring and mixing unit 2 include a structure including a mixing chamber 20, a stirring mechanism 21, a storage tank 22 that stores the liquid L, a liquid supply pipe 23 that supplies the liquid L to the mixing chamber 20, a discharge pipe 24 that discharges the mixture M obtained by stirring and mixing in the mixing chamber 20 to the outside of the mixing chamber 20.

The mixing chamber 20 may be anyone that forms a space for stirring and mixing the powder P with the liquid L, and the specific structure thereof is not particularly limited. The mixing chamber 20 may include one space or may be partitioned so as to have a plurality of spaces.

The stirring mechanism 21 is for stirring and mixing the powder P and the liquid L fed into the mixing chamber 20 and is provided in the mixing chamber 20.

Examples of the stirring mechanism 21 include a stirring mechanism including a configuration in which a structure such as a uniaxial stirring blade and a blade is used and stirring and mixing are performed, a stirring mechanism including a configuration in which dispersion based on ultrasonic waves is performed, a stirring mechanism including a configuration in which a planetary mixer, a biaxial kneader, and the like are used and dispersion based on a shearing force is performed, a stirring mechanism including a configuration in which dispersion is performed by cavitation and a shearing force, and the like. In addition, from the viewpoint that excessive pulverization of the powder is unlikely to occur, it is more preferable to use a stirring mechanism including a configuration in which the dispersion is performed by cavitation and a shearing force. Examples of the configuration in which the dispersion is performed by cavitation and a shearing force include known configurations, already commercially available, such as Jet Paceter (registered trademark) made by Nihon Spindle Manufacturing Co., Ltd.

Additionally, as the stirring and mixing unit 2, it is preferable to use a stirring and mixing unit in which the inside of the stirring and mixing unit 2 is in a negative pressure state. Accordingly, since the powder P fed from the powder feed unit 3 described below is quickly introduced into the stirring and mixing unit 2, the contact between the powder P and the atmospheric moisture can be more reliably blocked.

Examples of the stirring and mixing unit 2 having a negative pressure state inside include stirring and mixing units having a configuration capable of reducing the pressure inside the mixing chamber 20. Examples of such a configuration include providing a pressure-reducing mechanism directly in the mixing chamber 20 and forming a negative pressure state in the mixing chamber 20 by circulating and supplying the liquid L to the mixing chamber 20. In addition, since stirring mechanisms that perform dispersion by cavitation and a shearing force among the above-described stirring mechanisms 21 include making the pressure in the mixing chamber 20 negative as a configuration for generating cavitation, the stirring and mixing in the present embodiment can be suitably used as the stirring and mixing unit 2.

The storage tank 22 stores the liquid L supplied into the mixing chamber 20. The storage tank 22 may be any as long as the storage tank can store the liquid L, and the specific structure is not particularly limited.

Additionally, the liquid supply pipe 23 may be any as long as the liquid supply pipe can connect the storage tank 22 and the mixing chamber 20 to each other and supply the liquid L, and the specific structure is not particularly limited.

In addition, the liquid supply pipe 23 may be connected so that the liquid L can be circulated between the mixing chamber 20 and the storage tank 22. Accordingly, it is possible to improve the efficiency of stirring and mixing by the stirring mechanism 21. In particular, in a case where a configuration in which cavitation is caused is used as the stirring mechanism 21, it is preferable that the liquid L can be circulated. Accordingly, it is possible to form a negative pressure state in the mixing chamber 20 and cause cavitation.

Moreover, in a case where the liquid supply pipe 23 is connected so that the liquid L can be circulated, the liquid L may be circulated together with the mixture M after the start of the mixing treatment between the powder P and the liquid L in the stirring and mixing unit 2. Accordingly, it is possible to obtain the effect that, in the preparation of the mixture M, the work efficiency can be improved and the quality of the mixture M can be improved.

The mixture M prepared in the mixing chamber 20 is discharged to the outside of a system via the discharge pipe 24. As shown in FIG. 1, in a case where the liquid supply pipe 23 is connected in a circulatory manner in addition to the discharge pipe 24 being provided independently, a part of the liquid supply pipe 23 is branched. In addition, the mixture M discharged to the outside of the system may be directly transferred to an implementation spot or use point for the next process, or may be stored in a storage tank or the like for storing the mixture M.

Powder Feed Unit (Powder Feed Member)

The powder feed unit 3 stores the powder P and charges the powder P into the stirring and mixing unit 2.

The structure of the powder feed unit 3 may be any structure as long as the structure has a configuration in which the powder P can be stored and sealed and a dry gas G supplied from the dry gas generation unit 4 can be introduced, and the specific structure thereof is not particularly limited. In addition, a sealable configuration in the present embodiment refers to a configuration capable of restricting the inflow of outside air into the powder feed unit 3.

As shown in FIG. 1, examples of the powder feed unit 3 include a powder feed unit including a powder holding portion 30 that holds the powder P, a powder charging portion 31a that charges the powder P, a powder discharging portion 31b that discharges the powder P, and a powder feed pipe 32 that feeds the discharged powder P to the stirring and mixing unit 2. Additionally, a dry gas introducing portion 33 for introducing the dry gas G supplied from the dry gas generation unit 4 into the powder holding portion 30 is provided on the powder charging portion 31a side. Also, a shutter 34 is provided on the powder feed pipe 32, and the feed of the powder P to the stirring and mixing unit 2 is controlled by opening and closing the shutter 34.

The powder holding portion 30 may be a powder holding portion having any shape and material capable of storing the powder P and is not particularly limited. Examples of the shape of the powder holding portion 30 include a shape of which a side surface is inclined such that the cross-sectional area becomes smaller from the powder charging portion 31a toward the powder discharging portion 31b, in addition to a cylindrical shape or a rectangular parallelepiped shape. Additionally, the material of the powder holding portion 30 is not particularly limited as long as the material can limit the inflow of outside air and has the strength for storing the powder P. For example, a functional sheet having a non-metal such as plastic or cloth as a base material may be used in addition to a metal such as steel.

The powder charging portion 31a and the powder discharging portion 31b of the powder holding portion 30 are provided with a configuration that allows the powder holding portion 30 to be sealed. As shown in FIG. 1, examples of such a configuration include one in which the powder charging portion 31a and the powder discharging portion 31b are provided with lid portion 35a and 35b, respectively, and the lid portions 35a and 35b are provided with sealing means 36. Examples of the sealing means 36 include sealing means using packing, sealing means that performs fixation by using bolts, clamps, and the like.

Additionally, examples of other configurations in which the powder holding portion 30 is sealed include one in which the powder holding portion 30 itself is made of a deformable material, and the powder charging portion 31a and the powder discharging portion 31b themselves of the powder holding portion 30 are closed and sealed by locking means.

The means for introducing the powder P into the powder holding portion 30 of the powder feed unit 3 is not particularly limited. Examples of the means include providing and continuously introducing a pipe connecting the powder charging portion 31a side of the powder holding portion 30 and a container that stores the powder P to each other, or directly introducing the powder P into the open powder charging portion 31a in a batch manner.

In the present embodiment, as will be described below, since the powder P introduced into the powder holding portion 30 is supplied with the dry gas G from the dry gas generation unit 4, the contact with the atmospheric moisture is blocked the powder P is fed to the stirring and mixing unit 2 and during the feed of the powder. Accordingly, when the powder P is introduced into the powder holding portion 30, no special operation is required.

In addition, the dry gas G may be supplied also when the powder P is introduced into the powder holding portion 30. In this case, it is preferable to seal the powder holding portion 30 with the dry gas G in a positive pressure state. Accordingly, even while the powder P is stored (held) in the powder holding portion 30, the amount of moisture of the powder holding portion 30 can be reduced, the inflow of outside air can be suppressed, and the influence of the atmospheric moisture to the powder P can be further reduced.

Additionally, in particular, in a case where the powder P is susceptible to the influence of the atmospheric moisture, the powder P may be introduced into the powder holding portion 30 in a dry room or a glove box, and then the sealed powder holding portion 30 may be connected to the stirring and mixing unit 2 or the dry gas generation unit 4. Accordingly, it is possible to block the contact between the powder P and the atmospheric moisture more reliably.

The dry gas introducing portion 33 is not particularly limited as long as the dry gas introducing portion 33 can introduce the dry gas G from the dry gas generation unit 4 into the powder holding portion 30. Examples of the dry gas introducing portion 33 include a pipe having a joint structure that communicates with the powder holding portion 30 and is capable of connecting the gas supply pipe 41 of the dry gas generation unit 4. Additionally, it is preferable that the dry gas introducing portion 33 is provided with a sealable structure when the dry gas introducing portion 33 is detached from the gas supply pipe 41. Accordingly, it is possible to suppress the inflow of outside air into the powder holding portion 30. Examples of such a sealable structure include providing a lid portion and sealing means similar to the powder charging portion 31a and the powder discharging portion 31b, providing a check valve in the dry gas introducing portion 33, and the like.

In addition, the powder feed unit 3 may be provided with various incidental mechanisms. As shown in FIG. 1, examples of such an incidental mechanism include one in which the powder holding portion 30 is provided with a safety valve 37. As will be described below, the dry gas G obtained by the dry gas generation unit 4 is supplied into the powder holding portion 30. Accordingly, it is preferable to provide the safety valve 37 to prevent the inside of the powder holding portion 30 from being brought into an overpressure state. Additionally, other examples of the incidental mechanism include a stirring mechanism that stirs the powder P in the powder holding portion 30, a quantitative supply mechanism that quantitatively feeds the powder P to the stirring and mixing unit 2, and the like. Dry gas generation unit The dry gas generation unit 4 is for supplying the dry gas G to the powder feed unit 3.

The structure of the dry gas generation unit 4 may be any structure as long as the dry gas G can be supplied to the above-described powder feed unit 3, and the specific structure is not particularly limited. In addition, the dry gas G in the present embodiment refers to a gas having a small amount of moisture and a gas in which a reaction with the powder P does not occur, and examples thereof include carbon dioxide gas, dry air, and the like in addition to inert gases such as nitrogen gas, argon gas, helium gas, and neon gas. Additionally, as the dry gas G, under atmospheric pressure, it is preferable to use a dry gas G having a dew point temperature of −40° C. or lower and it is more preferable to use a dry gas G having a dew point temperature of −70° C. or lower. Accordingly, it is possible to block the contact between the powder P and the atmospheric moisture more reliably.

As shown in FIG. 1, an example of the dry gas generation unit 4 includes a dry gas generation unit including a dry gas source 40, and the gas supply pipe 41 that supplies the dry gas G to the powder holding portion 30 in the powder feed unit 3. Additionally, the gas supply pipe 41 includes a gas flow rate adjusting mechanism 42 that connects the dry gas source 40 and a dry gas introduction port 33 to each other and controls the supply amount of the dry gas G.

The dry gas source 40 is not particularly limited as long as the dry gas source 40 can generate or store the dry gas G. Examples of the dry gas source 40 include a dry gas source using a high-pressure gas container of an inert gas or carbon dioxide gas, or a dry gas source using a dry air generating device capable of generating air from which moisture has been removed. In addition, the specific configuration of the dry air generating device is not particularly limited, and known ones may be used.

The gas flow rate adjusting mechanism 42 provided on the gas supply pipe 41 may be any as long as the gas flow rate adjusting mechanism can control the supply amount of the dry gas G, and examples thereof include pressurizing means such as a pump, in addition to a flow valve and a valve. In addition, in a case where the high-pressure gas container is used as the dry gas source 40, it is not necessary to provide the pressurizing means, such as a pump, as the gas flow rate adjusting mechanism 42.

A powder feed process in the dispersion device 1A of the present embodiment will be described with reference to FIGS. 2 and 3.

Figure 2:
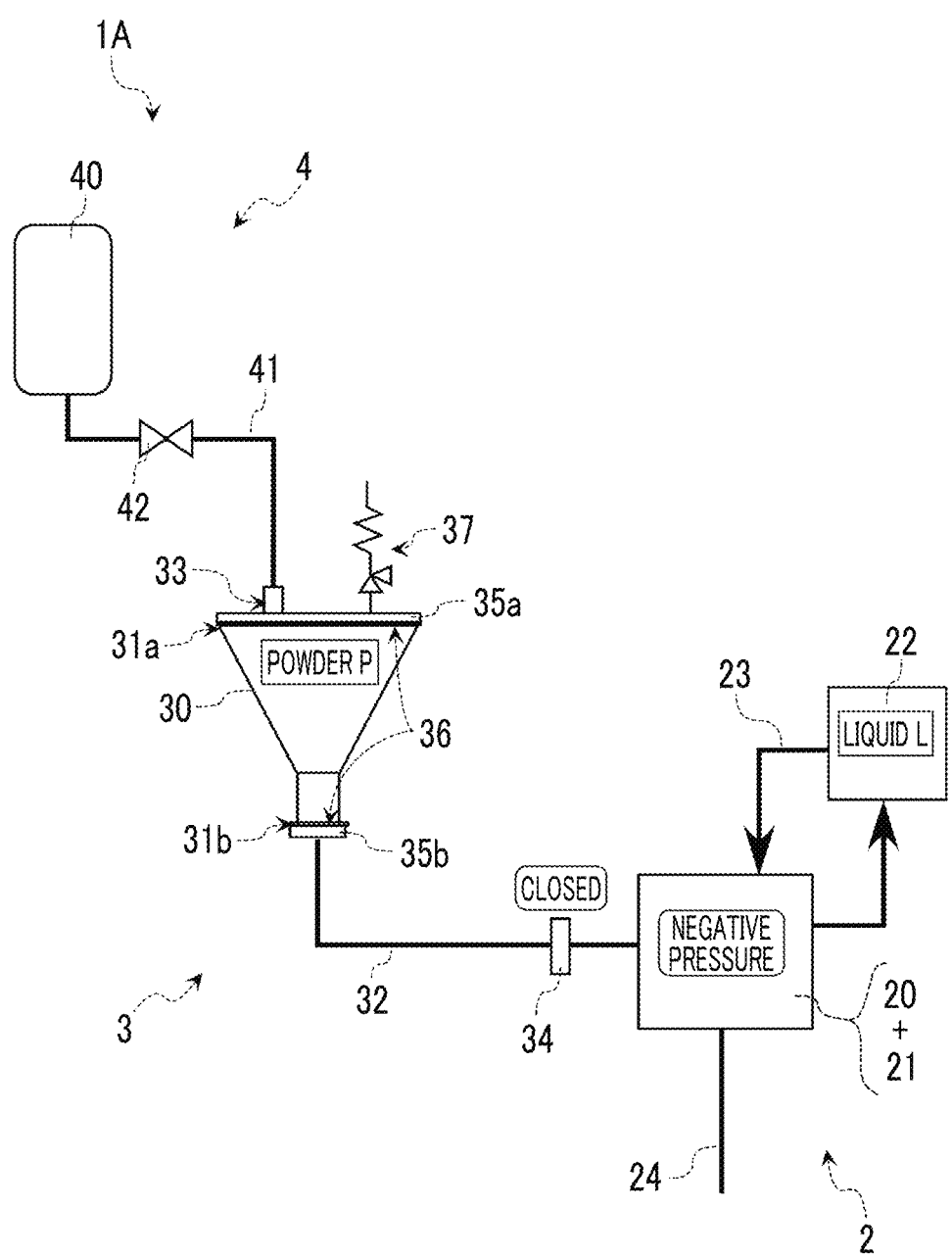
FIG. 2 is a schematic explanatory view showing a powder feed process in the dispersion device according to the one embodiment of the present invention.
Figure 3:
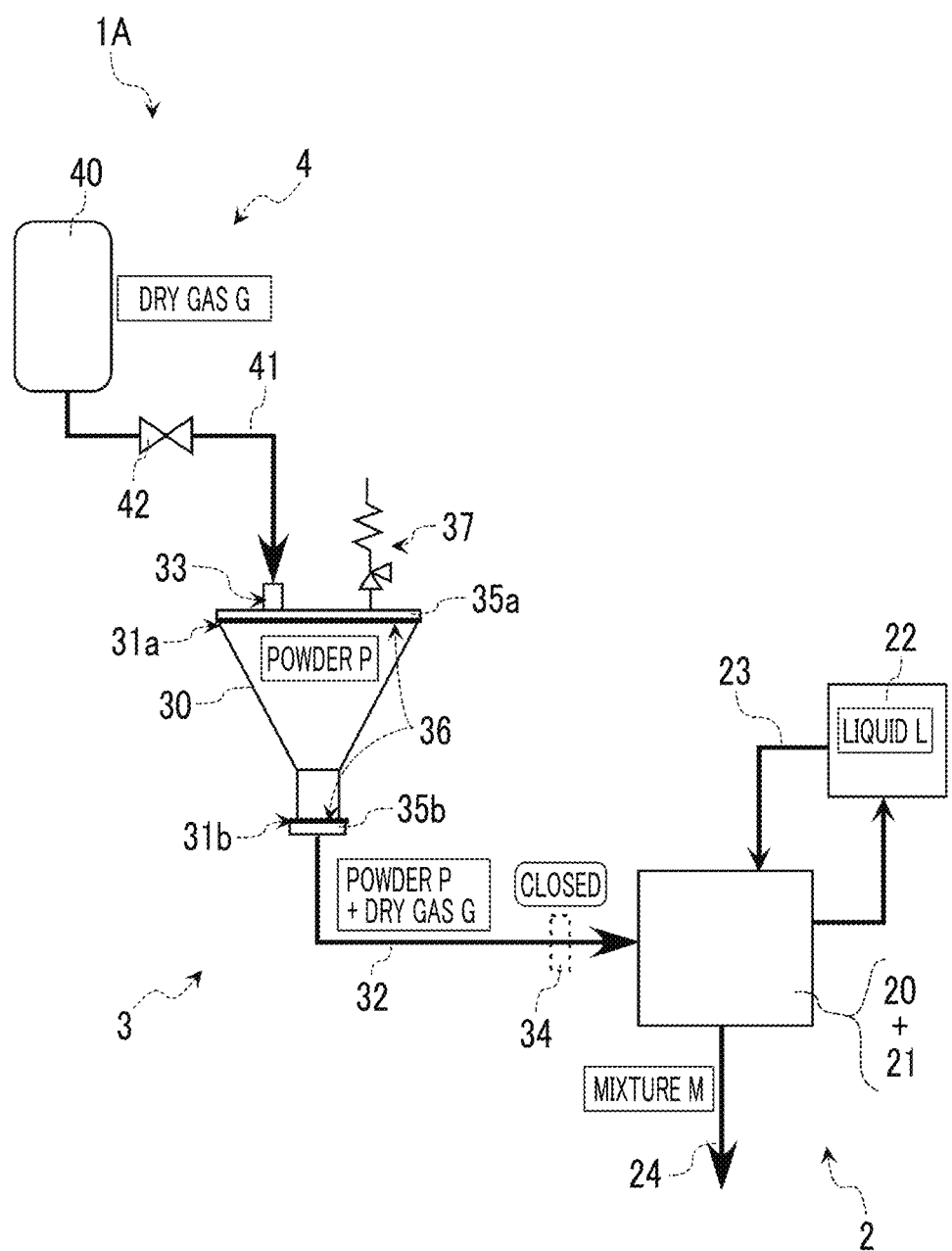
FIG. 3 is another schematic explanatory view showing the powder feed process in the dispersion device according to the one embodiment of the present invention.

FIGS. 2 and 3 are schematic explanatory views showing the powder feed process in the dispersion device 1A of the present embodiment. The configuration of the dispersion device in FIGS. 2 and 3 is the same as the configuration shown in FIG. 1. In addition, as the stirring and mixing unit 2, a stirring and mixing unit including the stirring mechanism 21 that causes a negative pressure state by the circulation of the liquid L is exemplified. Additionally, arrows in FIGS. 2 and 3 indicate the movement direction of the powder P, the liquid L, or the dry gas G.

As shown in FIG. 2, the stirring and mixing unit 2 is driven to circulate the liquid L in a state in which the powder feed unit 3 including the powder holding portion 30 in which the powder P is stored in advance is connected to the stirring and mixing unit 2 and the dry gas generation unit 4 and the shutter 34 is closed. Accordingly, a negative pressure state occurs in the mixing chamber 20 in the stirring and mixing unit 2.

Next, as shown in FIG. 3, when the shutter 34 is opened, the powder P in the powder feed unit 3 is quickly introduced into the mixing chamber 20 of the stirring and mixing unit 2 via the powder feed pipe 32. Accordingly, the powder P and the liquid L are stirred and mixed in the mixing chamber 20 to prepare the mixture M.

Additionally, in this case, the gas flow rate adjusting mechanism 42 on the gas supply pipe 41 of the dry gas generation unit 4 is controlled to supply the dry gas G into the powder holding portion 30 of the powder feed unit 3. Accordingly, the contact between the powder P in the powder feed unit 3 and the atmospheric moisture is blocked, and the powder P is fed to the mixing chamber 20 of the stirring and mixing unit 2 together with the dry gas G via the powder feed pipe 32. Moreover, it is preferable to supply the dry gas G in a pressurized state by controlling the gas flow rate adjusting mechanism 42 to make the positive pressure state in the powder holding portion 30 positive. Accordingly, the effects are exhibited that the transfer of the powder P can be made to proceed more quickly, the contact between the powder P and the atmospheric moisture can be more reliably blocked, and the drive time of the dispersion device 1A as a whole can be shortened.

By feeding the powder P from the powder feed unit 3 to the stirring and mixing unit 2 on the basis of the above process, the contact with the atmospheric moisture can be easily blocked during the storage and transfer of the powder P. Additionally, by feeding the powder P to the stirring and mixing unit 2 on the basis of the above processes, the atmosphere does not flow into the stirring and mixing unit 2 during the feed of the powder P even in the stirring and mixing unit 2 brought into a negative pressure state, and it is possible to make the preparation of the mixture M proceed in a state where moisture other than the liquid L is blocked.

The configuration according to the powder feed unit 3 in the present embodiment can be independent as the powder feed member according to the present invention. The powder feed member can be applied to an existing dispersion device including a stirring and mixing unit. In particular, in a case where powder that reacts with the atmospheric moisture is handled, the powder feed member (powder feed unit 3) of the present invention is applied to the existing dispersion device to introduce dry gas. Accordingly, it is possible to improve the functions of the existing dispersion device without large-scale facility renewal.

As described above, the dispersion device 1A of the present embodiment allows the powder feed unit to be sealed and allows the dry gas to be supplied to easily block the contact between the powder before being mixed with the liquid and the atmospheric moisture. Accordingly, it is possible to suppress the influence of the powder by the atmospheric moisture without providing a dry room that covers the entire device during the storage and transfer of the powder, to maintain and improve the performance of the mixture after mixing, and to ensure safety during mixing work at low cost.

Additionally, the powder feed member of the present embodiment allows the contact between the powder and the atmospheric moisture to be easily blocked before mixing with the liquid even in the existing dispersion device. Accordingly, in the existing dispersion device, it is possible to significantly reduce the cost related to the facility renewal for handling the powder affected by the atmospheric moisture.

Another Embodiment

Figure 4:
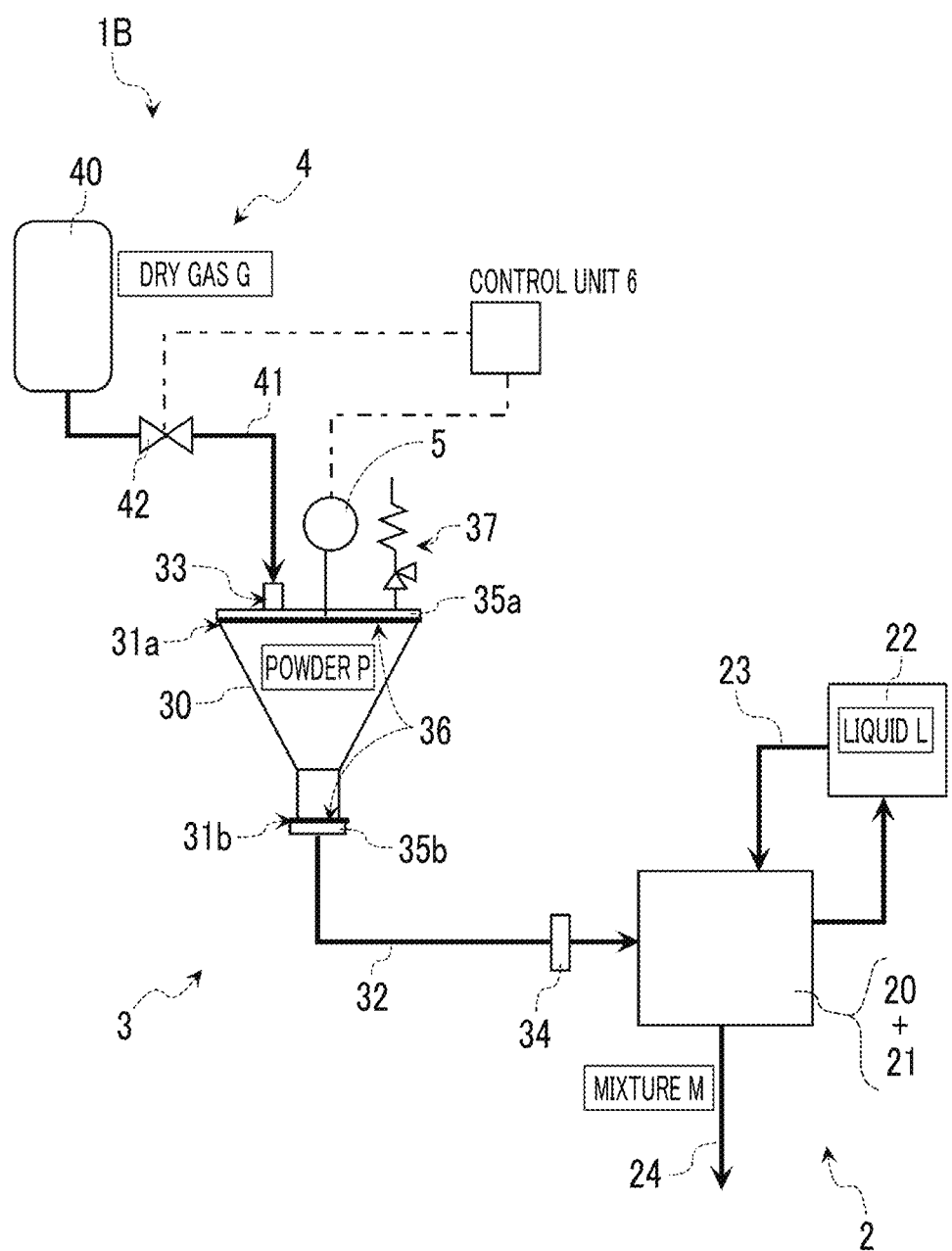
FIG. 4 is a schematic explanatory view showing a structure of a dispersion device according to another embodiment of the present invention.

FIG. 4 is a schematic explanatory view showing a configuration of a dispersion device according to another embodiment of the present invention.

As shown in FIG. 4, the dispersion device 1B of the embodiment is a dispersion device in which the powder holding portion 30 of the powder feed unit 3 shown in the dispersion device 1A of the one embodiment is provided with a pressure gauge 5 and a control unit 6 that controls the gas flow rate adjusting mechanism 42 on the basis of the value of the pressure gauge 5 is provided. In addition, one-dot broken line in FIG. 4 indicates that a connection is made in an inputtable or controllable manner. Additionally, the description of the same configuration as that of the one embodiment will be omitted.

The dispersion device 1B of the present embodiment is a dispersion device in which the pressure in the powder holding portion 30 is measured by the pressure gauge 5, the supply amount of the dry gas G is adjusted by the control unit 6 on the basis of the measured value, and the pressure in the powder holding portion 30 is adjusted. Accordingly, it is possible to detect a state in which the inside of the powder holding portion 30 deviates from a pressure value suitable for blocking the contact between the powder P and the atmospheric moisture. Additionally, the control unit 6 allows the pressure to be adjusted such that the pressure inside the powder holding portion 30 has an appropriate pressure value. For this reason, it is possible to quickly determine and respond to the appropriate handling of the powder P. Additionally, by connecting the pressure gauge 5 and the control unit 6 so that data can be input and controlled, it is possible to automate the management related to the storage and transfer of the powder P.

The pressure gauge 5 is not particularly limited as long as the pressure gauge can measure the pressure in the powder holding portion 30. The measurement result of the pressure gauge 5 may be directly input to the control unit 6 as measurement data, or the measurement result recorded by a worker may be manually input to the control unit 6. In addition, in order to automate the work related to the handling of the powder P, it is preferable that the measurement result of the pressure gauge 5 can be directly input to the control unit 6 as data.

The control unit 6 may be any as long as the control unit can control the gas flow rate adjusting mechanism 42 on the basis of the measurement result of the pressure gauge 5, and the specific configuration thereof is not particularly limited. Examples of the control unit 6 include a control unit including input means for inputting the measurement result of the pressure gauge 5 is within an appropriate range, determination means for performing determination whether or not the input value of the pressure gauge 5 is within an appropriate range, and adjusting means for controlling the gas flow rate adjusting mechanism 42 depending on the determination result obtained by the determination means to adjust the supply amount of the dry gas G. In addition, examples of the control of the gas flow rate adjusting mechanism 42 by the adjusting means include determining and operating the opening degree of a valve, adjusting the driving force of a pump, and the like.

As described above, the dispersion device 1B of the present embodiment is provided with a pressure gauge for measuring the pressure in the powder holding portion and a control unit for adjusting the supply amount of dry gas depending on the value of the pressure. Accordingly, a quick response to appropriate handling of the powder is possible. Additionally, the effect of facilitating the management itself related to the storage and transfer of powder is also exhibited.

Still Another Embodiment

Figure 5:
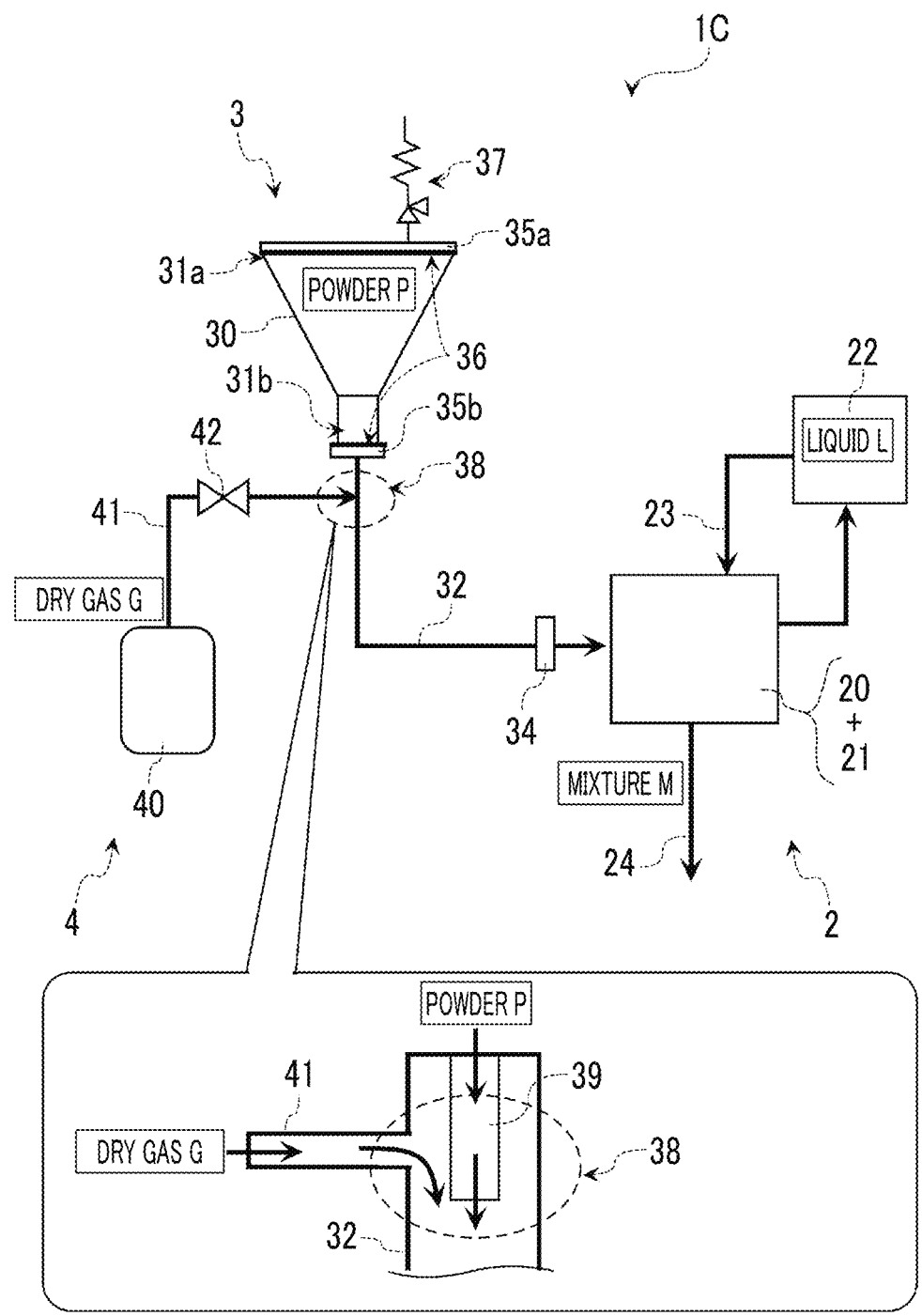
FIG. 5 is a schematic explanatory view showing a structure of a dispersion device according to still another embodiment of the present invention.

FIG. 5 is a schematic explanatory view showing the configuration of a dispersion device according to still another embodiment of the present invention.

As shown in FIG. 5, a dispersion device 1C of the embodiment is a dispersion device provided with a powder-gas mixing unit 38 in which the powder feed pipe 32 of the powder holding portion 30 and the gas supply pipe 41 of the dry gas generation unit 4 are connected to each other, instead of the dry gas introducing portion 33 provided in the powder holding portion 30 shown in the dispersion device 1A of the one embodiment. In addition, the description of the same configuration as that of the one embodiment will be omitted.

The dispersion device 1C of the present embodiment is a dispersion device in which, instead of bringing the powder P and the dry gas G into contact with each other in the powder holding portion 30, the powder-gas mixing unit 38 is provided, and the powder P and the dry gas G are mixed with each other when the powder P is fed from the powder feed pipe 32 to the stirring and mixing unit. In this case, the inside of the powder holding portion 30 can be brought into a normal pressure state, the influence of the powder P by the atmospheric moisture can be suppressed in the powder feed pipe 32, and the transfer of the powder P by the dry gas G can be propelled. Here, as shown in the one embodiment, in a case where the dry gas introducing portion 33 is provided in the powder holding portion 30 to supply the dry gas G, the inside of the powder holding portion 30 is in a positive pressure state. Accordingly, the transfer efficiency of the powder P is improved. However, when a propulsive force related to the transfer of the powder P is too strong, a situation may occur in which the feed amount of powder to the stirring and mixing unit 2 becomes too large. In this case, there is a concern that stable stirring and mixing treatment will be difficult. On the other hand, in the dispersion device 1C of the present embodiment, by providing the powder-gas mixing unit 38, it is possible to suppress the excessive propulsive force in the transfer of the powder P and it is easy to appropriately perform control.

The powder-gas mixing unit 38 may be any as long as the powder-gas mixing unit can mix the powder P fed from the inside of the powder holding portion 30 and the dry gas G supplied from the gas supply pipe 41 with each other, and the specific structure thereof is not particularly limited.

As shown in FIG. 5, examples of the powder-gas mixing unit 38 include a powder-gas mixing unit in which a powder discharge pipe 39 is provided below the powder discharging portion 31b, the powder discharge pipe 39 is disposed inside the powder feed pipe 32, and the powder feed pipe 32 and the gas supply pipe 41 are connected to each other. In this case, the inside of the powder feed pipe 32 has a double structure, the powder P is discharged from an inner pipe (powder discharge pipe 39), and the dry gas G is supplied from an outer pipe (powder feed pipe 32) and mixed with the powder P. Additionally, as shown in FIG. 5, it is preferable that the powder discharge pipe 39 and the gas supply pipe 41 are disposed such that the airflow of the dry gas G supplied from the gas supply pipe 41 is parallel to a discharge direction of the powder P. Accordingly, it is possible to increase the mixing efficiency of the powder P and the dry gas G and to perform stable transfer of the powder P.

In the dispersion device 1C of the present embodiment, examples of the means for introducing the powder P into the powder feed unit 3 include one in which the powder P is introduced into the powder holding portion 30 in a dry room or a glove box and then the sealed one is connected to the stirring and mixing unit 2 and the dry gas generation unit 4. Accordingly, even while the powder P is stored (held) in the powder holding portion 30, the inflow of outside air is suppressed without directly supplying the dry gas G to the powder holding portion 30, and the influence of the atmospheric moisture to the powder P can be reduced.

Additionally, the dispersion device 1C of the present embodiment may be a dispersion device provided with means for supplying the dry gas G to the powder holding portion 30 when the powder P is introduced into the powder holding portion 30. In this case, it is preferable to supply the dry gas G such that the pressure inside the powder holding portion 30 is substantially normal. Accordingly, the influence of the atmospheric moisture on the powder P while the powder P is stored (held) in the powder holding portion 30 can be suppressed, and the generation of an excessive propulsive force related to the transfer of the powder P during the feed of the powder can be suppressed.

As described above, by virtue of the dispersion device 1C of the present embodiment, by providing the powder-gas mixing unit that supplies the dry gas not in a powder holding space (powder holding portion) in the powder feed unit but on the pipe (powder feed pipe) for transferring the powder, it is possible to block the contact between the powder before mixing with the liquid and the atmospheric moisture, and it is easy to appropriately control the propulsive force related to the transfer of the powder. Accordingly, it is easy to maintain and improve the performance of the mixture after mixing and to appropriately perform the control related to the feed amount of powder during the mixing work.

In addition, the above-described embodiments show examples of the dispersion device and the powder feed member. The dispersion device and the powder feed member according to the present invention are not limited to the above-described embodiments, and the dispersion devices and the powder feed members according to the above-described embodiments may be modified without changing the concept described in the claims.

For example, in the dispersion devices of the present embodiments, the control unit that controls the gas flow rate adjusting mechanism may be controllably connected to the safety valve. Accordingly, in a case where the pressure in the powder holding portion is brought into an overpressure state, it is possible to set the pressure in the powder holding portion more quickly to be within an appropriate range.

The dispersion device and powder feed member of the present invention can be used in various technical fields for performing the mixing between powder and liquid, for example, in food manufacturing, cosmetics manufacturing, material preparation of industrial products, and the like. In particular, in a case where it is necessary to handle the powder that is affected by the atmospheric moisture, the present invention can be suitably used as a technique capable of blocking the contact between the powder and the atmospheric moisture to perform the mixing.

It should be understood that the invention is not limited to the above-described embodiment, but may be modified into various forms on the basis of the spirit of the invention. Additionally, the modifications are included in the scope of the invention.

What is claimed is:

1. A dispersion device comprising:
a stirring and mixing unit that mixes a powder with a liquid;
a powder feed unit that feeds the powder to the stirring and mixing unit, the powder feed unit including a powder holding portion which holds the powder, a powder discharge pipe which is disposed downstream of the powder holding portion, and a powder feed pipe which is disposed downstream of the powder holding portion and connected to the stirring and mixing unit; and
a dry gas generation unit that supplies a dry gas to the powder feed unit,
wherein the powder feed unit is sealable,
a gas supply pipe from the dry gas generation unit is connected to the powder feed pipe,
the powder discharge pipe is disposed inside the powder feed pipe, and
the dry gas supplied from the gas supply pipe merges with the powder via an outer pipe of the powder discharge pipe.

2. The dispersion device according to claim 1,
wherein an inside of the stirring and mixing unit is in a negative pressure state.

3. The dispersion device according to claim 1,
wherein the stirring and mixing unit includes a mixing chamber, a stirring mechanism, a storage tank that stores the liquid, a liquid supply pipe that supplies the liquid to the mixing chamber, and a discharge pipe that discharges a mixture obtained by stirring and mixing in the mixing chamber to an outside of the mixing chamber.

4. The dispersion device according to claim 3,
wherein the mixing chamber includes one or more spaces, and
the stirring mechanism includes a configuration in which dispersion is performed by cavitation and a shearing force.

5. The dispersion device according to claim 4,
wherein the liquid supply pipe connects the mixing chamber and the storage tank so that the liquid can be circulated between the mixing chamber and the storage tank.

6. The dispersion device according to claim 1,
wherein an inside of the powder feed unit is in a positive pressure state.

7. The dispersion device according to claim 1,
wherein the powder feed unit includes the powder holding portion that holds the powder, a powder charging portion that charges the powder, a powder discharging portion that discharges the powder, and the powder feed pipe that feeds the discharged powder to the stirring and mixing unit.

8. The dispersion device according to claim 7,
wherein the powder charging portion and the powder discharging portion are provided with a lid portion that allows the powder holding portion to be sealed.

9. The dispersion device according to claim 7, further comprising a powder-gas mixing unit that connects the powder feed pipe and the dry gas generation unit.

10. The dispersion device according to claim 9,
wherein the powder-gas mixing unit is provided with the powder discharge pipe below the powder discharging portion.

11. The dispersion device according to claim 1,
wherein the dry gas generation unit includes a dry gas source, and the gas supply pipe that supplies the dry gas to the powder feed unit.

12. The dispersion device according to claim 11,
wherein the gas supply pipe includes a gas flow rate adjusting mechanism that controls a supply amount of the dry gas.

13. The dispersion device according to claim 1, further comprising:
a pressure gauge that measures an internal pressure of the powder feed unit; and
a control unit that adjusts a supply amount of the dry gas supplied from the dry gas generation unit on the basis of a pressure value measured by the pressure gauge.

14. A powder feed member that feeds a powder to a stirring and mixing unit that mixes the powder with a liquid, the powder feed member comprising:
a powder holding portion that holds the powder;
a powder feed pipe that is disposed downstream of the powder holding portion and connected to the stirring and mixing unit;
a dry gas introducing portion that introduces a dry gas;
a powder discharging portion that discharges the powder; and
a powder discharge pipe that is disposed downstream of the powder discharging portion,
wherein the powder holding portion is sealable,
a gas supply pipe from the dry gas introducing portion is connected to the powder feed pipe,
the powder discharge pipe is disposed inside the powder feed pipe, and
the dry gas supplied from the gas supply pipe merges with the powder via an outer pipe of the powder discharge pipe.

* * * * *